United States Patent
Bunazawa et al.

(10) Patent No.: US 12,469,336 B2
(45) Date of Patent: *Nov. 11, 2025

(54) VEHICLE EVALUATION SYSTEM

(71) Applicant: TOYOTA JIDOSHA KABUSHIKI KAISHA, Toyota (JP)

(72) Inventors: Hideaki Bunazawa, Nagoya (JP); Shintaro Mukogawa, Nagoya (JP); Rikako Zenibana, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 235 days.

This patent is subject to a terminal disclaimer.

(21) Appl. No.: 18/301,666

(22) Filed: Apr. 17, 2023

(65) Prior Publication Data

US 2023/0377382 A1    Nov. 23, 2023

(30) Foreign Application Priority Data

May 17, 2022 (JP) ................................ 2022-080738

(51) Int. Cl.
*G07C 5/00* (2006.01)
*G06N 3/09* (2023.01)
*G07C 5/08* (2006.01)

(52) U.S. Cl.
CPC ............ *G07C 5/008* (2013.01); *G06N 3/09* (2023.01); *G07C 5/0808* (2013.01)

(58) Field of Classification Search
CPC ......... G07C 5/008; G07C 5/0808; G06N 3/09
See application file for complete search history.

(56) References Cited

U.S. PATENT DOCUMENTS

2020/0226856 A1* 7/2020 Zamora Esquivel ................ G07C 5/0808
2021/0304786 A1 9/2021 Fujii
(Continued)

FOREIGN PATENT DOCUMENTS

DE 10 2019 219 371 A1 10/2020
JP 2014-222189 A 11/2014
(Continued)

OTHER PUBLICATIONS

Apr. 23, 2025 Office Action issued in U.S. Appl. No. 18/343,854.

*Primary Examiner* — James J Lee
*Assistant Examiner* — Steven Vu Nguyen
(74) *Attorney, Agent, or Firm* — Oliff PLC

(57) ABSTRACT

A vehicle evaluation system includes processing circuitry and a memory device. The memory device stores data of a pretrained model. The pretrained model is a model trained by supervised learning to generate operation data from training sound data. The operation data is data indicating changes in operation information in a measurement operation pattern. The processing circuitry is configured to perform a generation process and an evaluation process. The generation process is a process of outputting generated data which is data of operation information generated by inputting the evaluation data to the pretrained model. The evaluation data includes evaluation sound data recorded while operating a target vehicle in the measurement operation pattern. The evaluation process is a process of comparing the operation data with the generated data and evaluating the target vehicle in accordance with the magnitude of a difference therebetween.

12 Claims, 7 Drawing Sheets

(56) References Cited

U.S. PATENT DOCUMENTS

2021/0335064 A1* 10/2021 Kim .................... G07C 5/0833
2025/0083660 A1* 3/2025 Frazier ................ B60W 30/182

FOREIGN PATENT DOCUMENTS

| JP | 2020-123229 A | 8/2020 |
| JP | 2020-192925 A | 12/2020 |
| JP | 2021-195915 A | 12/2021 |
| WO | 2020/026829 A1 | 2/2020 |

* cited by examiner

VEHICLE EVALUATION SYSTEM

BACKGROUND

1. Field

The present disclosure relates to a vehicle evaluation system for evaluating a vehicle.

2. Description of Related Art

An inspection device has been known that detects an anomaly by analyzing sound data obtained by recording sound emitted from an inspection target. It has also been considered to perform anomaly detection using such sound data by using a pretrained model trained by machine learning. However, the occurrence of anomaly in the inspection target, from which the sound data is obtained, is rare. Therefore, it is difficult to obtain the sound data of the abnormal sound used for the machine learning.

PCT International Publication No. WO2020/026829 discloses a method of generating pseudo-abnormal sound data using normal sound data. The above publication discloses a method of performing machine learning by using normal sound data and pseudo-abnormal sound data. According to the method disclosed in the above publication, machine learning can be performed using pseudo-abnormal sound data even in a situation in which it is difficult to obtain abnormal sound.

As a vehicle evaluation system that evaluates a state of a vehicle, an evaluation system may evaluate a vehicle by analyzing sound data obtained by recording sound emitted from the vehicle. However, the sound emitted by the vehicle varies depending on the operating state of the vehicle. Further, to evaluate the state of the vehicle, it is necessary not only to determine from the sound data the state in which noise is generated due to an apparent failure, but also to perform evaluation by determining, from the sound data, a difference in the state of the vehicle. Therefore, a vehicle evaluation system suitable for evaluating a vehicle is desired.

SUMMARY

In one general aspect, a vehicle evaluation system is configured to evaluate a target vehicle, which is a vehicle to be evaluated, using sound data obtained by recording sound emitted from the target vehicle. The vehicle evaluation system includes processing circuitry and a memory device. The memory device stores data of a pretrained model trained with training data. The training data includes training sound data and operation data. The training sound data is data of sound emitted from a reference vehicle in a state serving as a reference for evaluation. The sound is recorded while the reference vehicle is operated in a measurement operation pattern for a specified time period. The operation data is data indicating changes in operation information in the measurement operation pattern. The pretrained model is a model trained by supervised learning to generate the operation data from the training sound data using the training data. The processing circuitry is configured to execute a generation process and an evaluation process. The generation process is a process of outputting generated data which is data of the operation information generated by inputting evaluation data to the pretrained model. The evaluation data includes evaluation sound data that is data of sound emitted from the target vehicle and recorded while operating the target vehicle in the measurement operation pattern. The evaluation process is a process of comparing the operation data with the generated data and evaluating the target vehicle according to a magnitude of a deviation between the operation data and the generated data.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, an embodiment of vehicle evaluation will be described with reference to FIGS. 1 to 9.

<Configuration of Vehicle Evaluation System>

Figure 1:
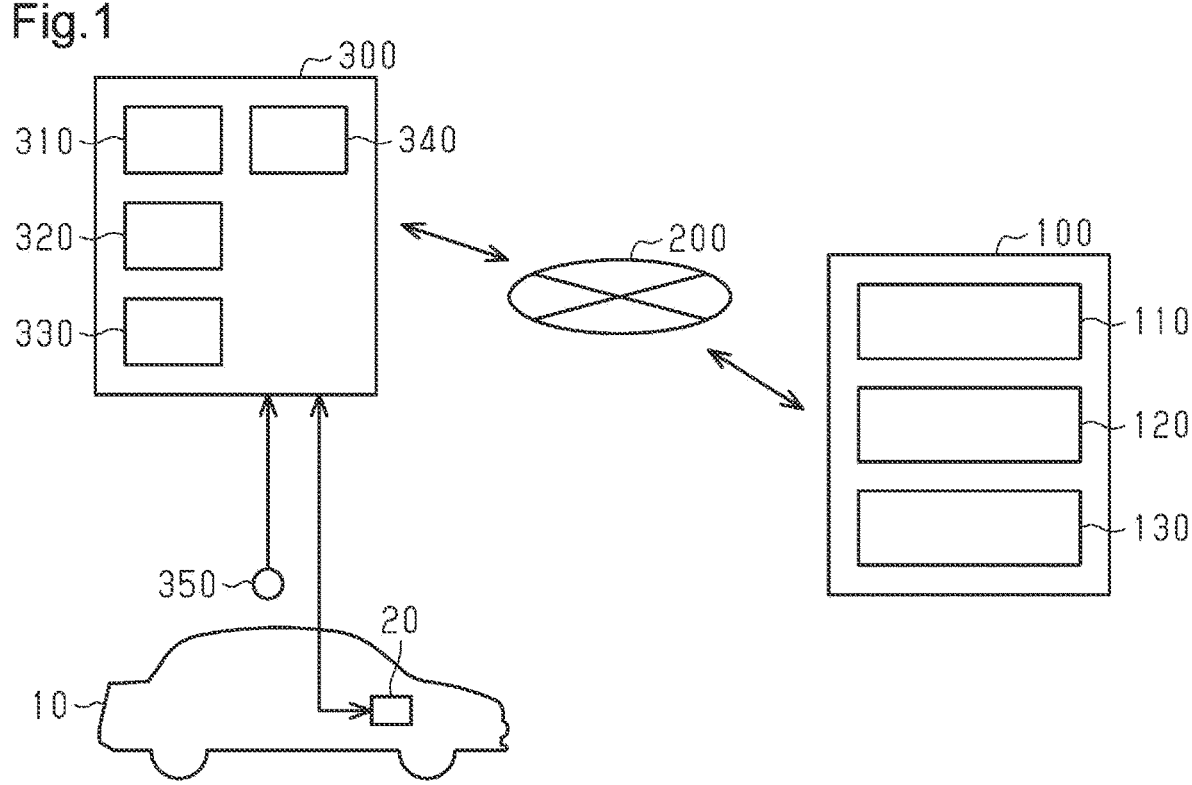
FIG. 1 is a schematic diagram showing a vehicle evaluation system according to one embodiment.

FIG. 1 illustrates a configuration of a vehicle evaluation system according to an embodiment. As shown in FIG. 1, the vehicle evaluation system includes a data center 100 and a vehicle controller 300. The data center 100 is communicably connected to the vehicle controller 300 via a communication network 200.

<Configuration of Data Center 100>

As illustrated in FIG. 1, the data center 100 includes a memory device 120, which stores programs, and processing circuitry 110, which executes programs stored in the memory device 120 to perform various processes. The data center 100 also includes a communication device 130. The communication device 130 is implemented as hardware such as a network adapter, various types of communication software, or a combination thereof. The communication device 130 is configured to implement wired or wireless communication via the communication network 200.

The data center 100 may include multiple computers. For example, the data center 100 may include multiple server devices.

<Configuration of Vehicle Controller 300>

The vehicle controller 300 is, for example, a personal computer. The vehicle controller 300 includes a memory device 320, which stores programs, and processing circuitry 310, which executes various processes by executing programs stored in the memory device 320. The vehicle controller 300 includes a communication device 330. The communication device 330 is implemented as hardware such as a network adapter, various types of communication software, or a combination thereof. The communication device 330 is configured to implement wired or wireless communication via the communication network 200.

In this embodiment, the vehicle controller 300 is connected to the data center 100 by wireless communication via the communication network 200. The vehicle controller 300 also includes a display device 340 for displaying information. The vehicle controller 300 may be a smartphone or a tablet terminal. The vehicle controller 300 also includes a microphone 350.

The microphone 350 is intended to record sounds emitted from a target vehicle 10, which is a vehicle to be evaluated by the vehicle evaluation system. When the target vehicle 10 is evaluated using the vehicle evaluation system, the microphone 350 is installed at a specified position with respect to the target vehicle 10. Further, the vehicle controller 300 is connected to a vehicle control unit 20 of the target vehicle 10. Then, a command is output from the vehicle controller 300 to the vehicle control unit 20, and the sound emitted from the target vehicle 10 is recorded by the microphone 350 while the target vehicle 10 is operated in a specified measurement operation pattern.

<Configuration of Vehicle Control Unit 20>

Figure 2:
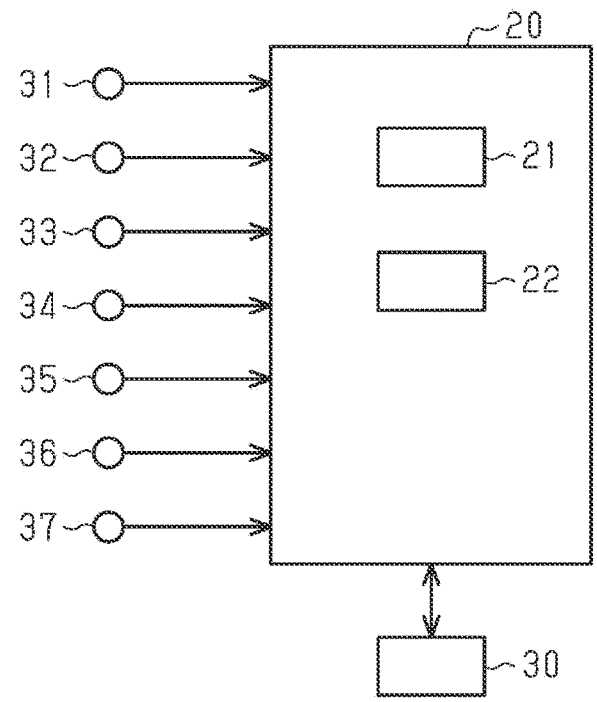
FIG. 2 is a schematic diagram showing a configuration of a vehicle control unit included in a vehicle evaluated by the vehicle evaluation system of FIG. 1.

As shown in FIG. 2, the vehicle control unit 20 includes a memory device 22, which stores programs, and processing circuitry 21, which executes programs stored in the memory device 22 to perform various controls. The vehicle control unit 20 controls various parts of the target vehicle 10.

The vehicle control unit 20 is connected to various sensors that detect the state of the target vehicle 10 and the like. For example, the vehicle control unit 20 is connected to a vehicle speed sensor 35, which detects a vehicle speed SPD, which is a speed of the target vehicle 10. The vehicle control unit 20 acquires information on the vehicle speed SPD detected by the vehicle speed sensor 35. For example, the vehicle control unit 20 is connected to a crank position sensor 34. The crank position sensor 34 outputs a crank angle signal corresponding to a change in a rotational phase of a crankshaft, which is an output shaft of the internal combustion engine mounted on the target vehicle 10. The vehicle control unit 20 calculates an engine rotation speed NE, which is a rotation speed of the crankshaft, based on the detection signal of the rotation angle of the crankshaft input from the crank position sensor 34. For example, the vehicle control unit 20 is connected to an air flow meter 33. The air flow meter 33 detects an intake air temperature THA and an intake air amount Ga. The intake air temperature THA is a temperature of air taken into a cylinder through an intake passage of the internal combustion engine mounted on the target vehicle 10. The intake air amount Ga is the mass of air taken into the cylinder of the internal combustion engine. The vehicle control unit 20 acquires information on the intake air temperature THA and the intake air amount Ga detected by the air flow meter 33. For example, the vehicle control unit 20 is connected to a coolant temperature sensor 36. The coolant temperature sensor 36 detects a coolant temperature THW which is a temperature of the coolant. The vehicle control unit 20 acquires the coolant temperature THW detected by the coolant temperature sensor 36. For example, the vehicle control unit 20 is connected to an air-fuel ratio sensor 37. The air-fuel ratio sensor 37 is installed in an exhaust pipe of the internal combustion engine. The air-fuel ratio sensor 37 detects the air-fuel ratio of the exhaust gas. The vehicle control unit 20 acquires the air-fuel ratio detected by the air-fuel ratio sensor 37. For example, the vehicle control unit 20 is connected to a throttle opening degree sensor 31. The throttle opening degree sensor 31 detects a throttle opening degree, which is the opening degree of the throttle valve provided in the intake passage of the internal combustion engine. The vehicle control unit 20 acquires the throttle opening degree detected by the throttle opening degree sensor 31. For example, the vehicle control unit 20 is connected to a brake hydraulic pressure sensor 32. The brake hydraulic pressure sensor 32 detects a brake hydraulic pressure. The vehicle control unit 20 acquires the brake hydraulic pressure detected by the brake hydraulic pressure sensor 32.

The vehicle control unit 20 is connected to a transmission control unit 30 that controls a transmission mounted on the target vehicle 10. The vehicle control unit 20 acquires information such as the gear ratio and the oil temperature of the transmission from the transmission control unit 30.

When the vehicle controller 300 is connected to the vehicle control unit 20 of the target vehicle 10, the target vehicle 10 can be operated by a command from the vehicle controller 300. When the vehicle controller 300 is connected to the vehicle control unit 20 of the target vehicle 10, the vehicle controller 300 can acquire information of the target vehicle 10 through the vehicle control unit 20.

<Flow of Evaluation by Vehicle Evaluation System>

As described above, in the vehicle evaluation system, when the target vehicle 10 is evaluated, the vehicle controller 300 is connected to the vehicle control unit 20 of the target vehicle 10. Then, the sound emitted from the target vehicle 10 is recorded with the microphone 350 while the target vehicle 10 is operated in the specified measurement operation pattern in response to a command from the vehicle controller 300. The vehicle controller 300 transmits data including data of the recorded sound to the data center 100. Then, the data center 100 executes an evaluation process of evaluating the target vehicle 10 using the received data.

<Measurement Operation Pattern>

Figure 3:
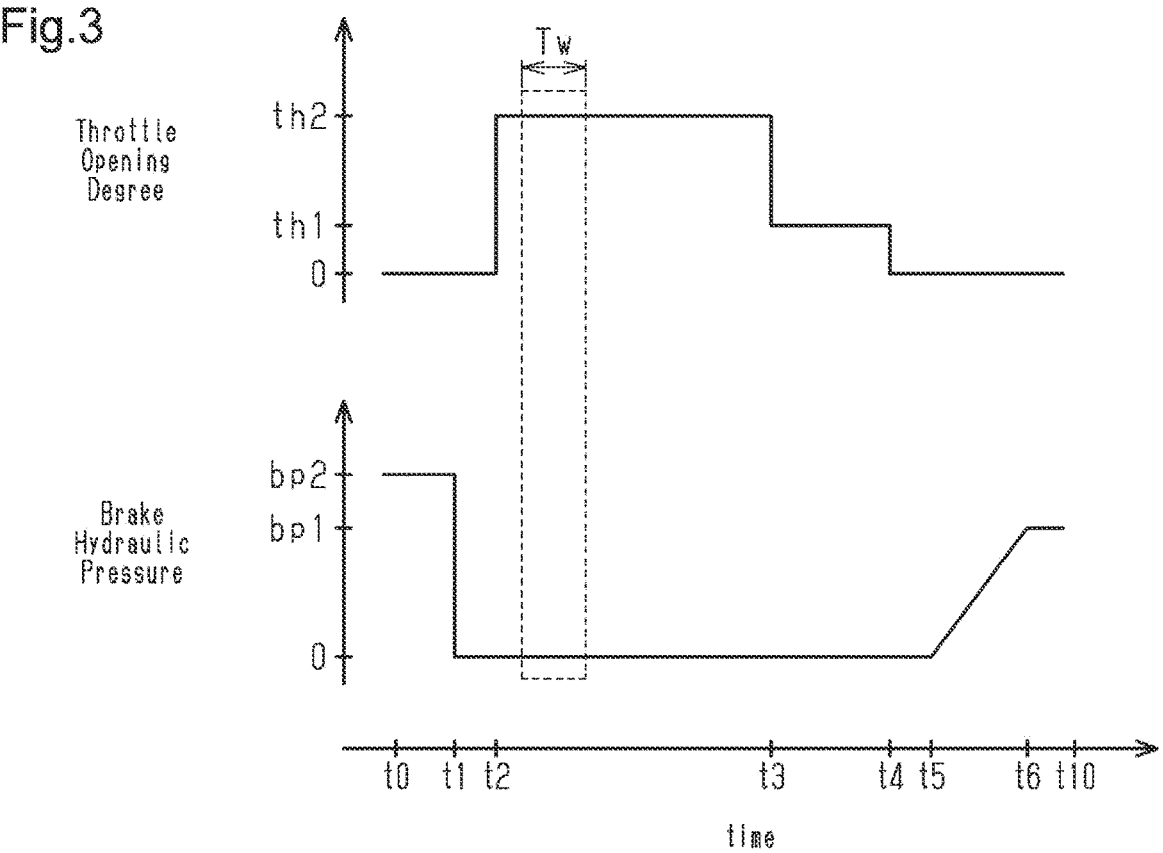
FIG. 3 is a timing diagram showing a measurement operation pattern used by the vehicle evaluation system of FIG. 1.

FIG. 3 is a timing diagram showing the measurement operation pattern in the vehicle evaluation system. As shown in FIG. 3, in the measurement operation pattern of the vehicle evaluation system, the throttle opening degree and the brake hydraulic pressure are operated over a specified time period from time t0 to time t10. The operation in the measurement operation pattern is not feedback control, but feedforward control in which the operation is performed in accordance with a command.

To be more specific, at time t0, when the measurement operation pattern is started, the throttle opening degree is 0 and the brake hydraulic pressure is bp2. The value of bp2 is greater than 0. Then, at time t1, the vehicle controller 300 operates the target vehicle 10 so that the brake hydraulic pressure becomes 0 through the vehicle control unit 20. Next, at time t2, the vehicle controller 300 operates the target vehicle 10 so that the throttle opening degree becomes th2 through the vehicle control unit 20. The value of th2 is greater than 0.

As shown in FIG. 3, at time t3, the vehicle controller 300 operates the target vehicle 10 through the vehicle control unit 20 so that the throttle opening degree becomes th1. The value of th1 is less than th2 and greater than 0. At time t4, the vehicle controller 300 operates the target vehicle 10 through the vehicle control unit 20 so that the throttle opening degree becomes 0. Then, the vehicle controller 300 operates the target vehicle 10 through the vehicle control unit 20 to increase the brake hydraulic pressure at a constant gradient from time t5 to time t6. The vehicle controller 300 increases the brake hydraulic pressure to bp1. The value of bp1 is greater than 0 and less than bp2. The vehicle controller 300 stops increasing the brake hydraulic pressure at time t6, and maintains the brake hydraulic pressure at bp1 after the time t6. Then, at time t10, the measurement operation pattern ends.

<Evaluation Data>

The vehicle controller 300 records, as evaluation sound data, the sound data recorded by the microphone 350 while operating the target vehicle 10 in the measurement operation pattern in the memory device 320. The vehicle controller 300 stores the intake air temperature THA detected by the air flow meter 33 in the memory device 320 as information on the outside air temperature at the time when the target vehicle 10 is operated in the measurement operation pattern. Then, the vehicle controller 300 stores the evaluation sound data and the outside air temperature data collected by the measurement for one time of the measurement operation pattern in the memory device 320 as one dataset for the specified time period.

The vehicle controller 300 crops each piece of data in a range of a window Tw, which has a time length shorter than the specified time period, from the dataset for the specified time period stored in the memory device 320, and shapes the piece of data into evaluation data. In a data shaping process of shaping the evaluation data, the vehicle controller 300 converts the evaluation sound data into a mel spectrogram, which is image data, by performing frequency analysis to handle the evaluation sound data.

Figure 4:
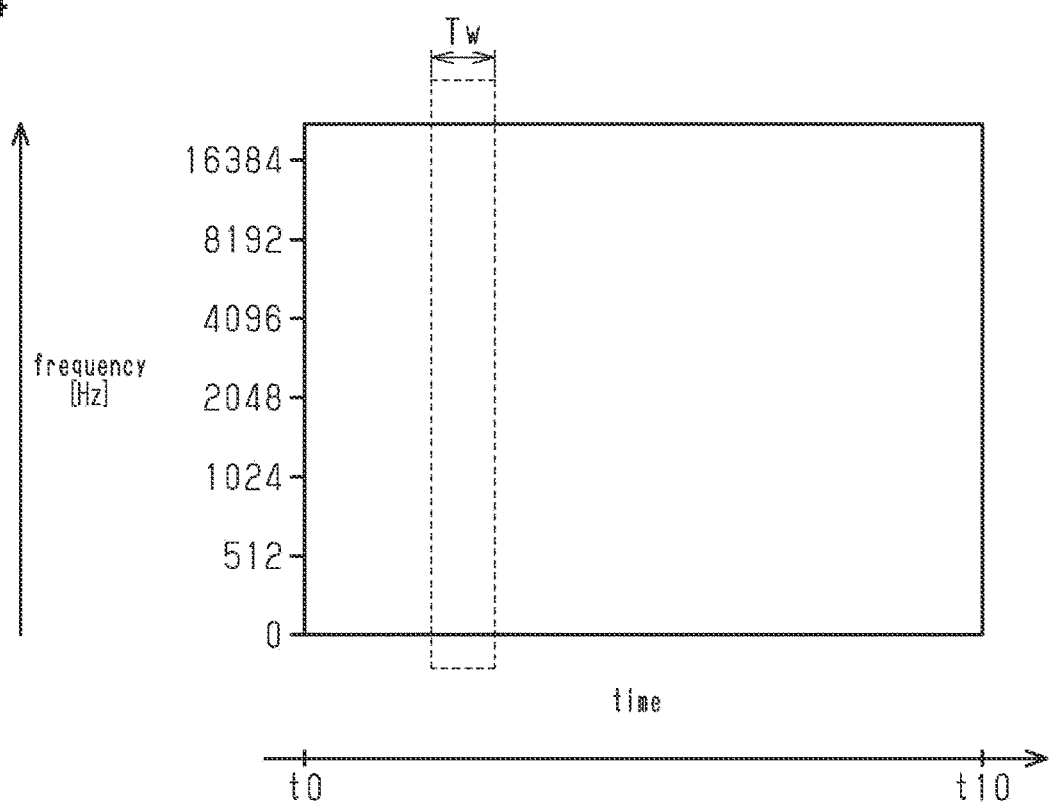
FIG. 4 is a mel spectrogram generated by a vehicle controller of the vehicle evaluation system of FIG. 1.

As shown in FIG. 4, in the mel spectrogram, the vertical axis represents the frequency, and the frequency on the vertical axis is represented by the mel scale. The horizontal axis is a time axis. In the mel spectrogram, intensity is represented by color. The lower the intensity of an area, the darker the blue-based color of the area becomes. The higher the intensity of an area, the brighter the red-based color of the area becomes. For example, from low to high intensity, areas are color coded in blue, green, yellow, orange, and red in that order. As shown in FIG. 4, the sound data included in one dataset for the specified time period is converted into one mel spectrogram corresponding to the specified time period from time t0 to time t10.

As shown in FIGS. 3 and 4, cropping of data is to extract data in a range of the window Tw, which has a time length shorter than the specified time period.

In the data shaping process, the controller 300 first crops the data corresponding to the window Tw starting from time t0. Then, each time cropping is completed, the vehicle controller 300 shifts the window Tw toward time t10 by a constant stride t_st, and performs the cropping again. The vehicle controller 300 repeats the cropping until the data obtained at time t10 is cropped. Then, the vehicle controller 300 combines, into one list, the image data obtained by converting the evaluation sound data and the data of the outside air temperature, which have been cropped in the window Tw starting from the same time point. The stride t_st has a time length shorter than the window Tw. Details of the data shaping process will be described below with reference to FIG. 7.

The vehicle controller 300 transmits the shaped evaluation data to the data center 100. Then, the data center 100 inputs the evaluation data shaped into multiple lists to a pretrained model trained by supervised learning, and performs the evaluation process.

<Pretrained Model>

The memory device 120 of the data center 100 stores data of a pretrained model used for evaluation of the target vehicle 10.

The data center 100 uses a model partially using ResNet-18, which is an image classification model, in order to handle the image data obtained by converting the evaluation sound data. ResNet-18 is a pre-trained image classification model trained on the ImageNet dataset. ResNet-18 is trained on a dataset of over one million images, and is capable of classifying input images into one thousand categories. The pretrained model stored in the memory device 120 of the data center 100 is a model obtained by performing transfer learning on ResNet-18 that has been trained in advance.

Figure 5:
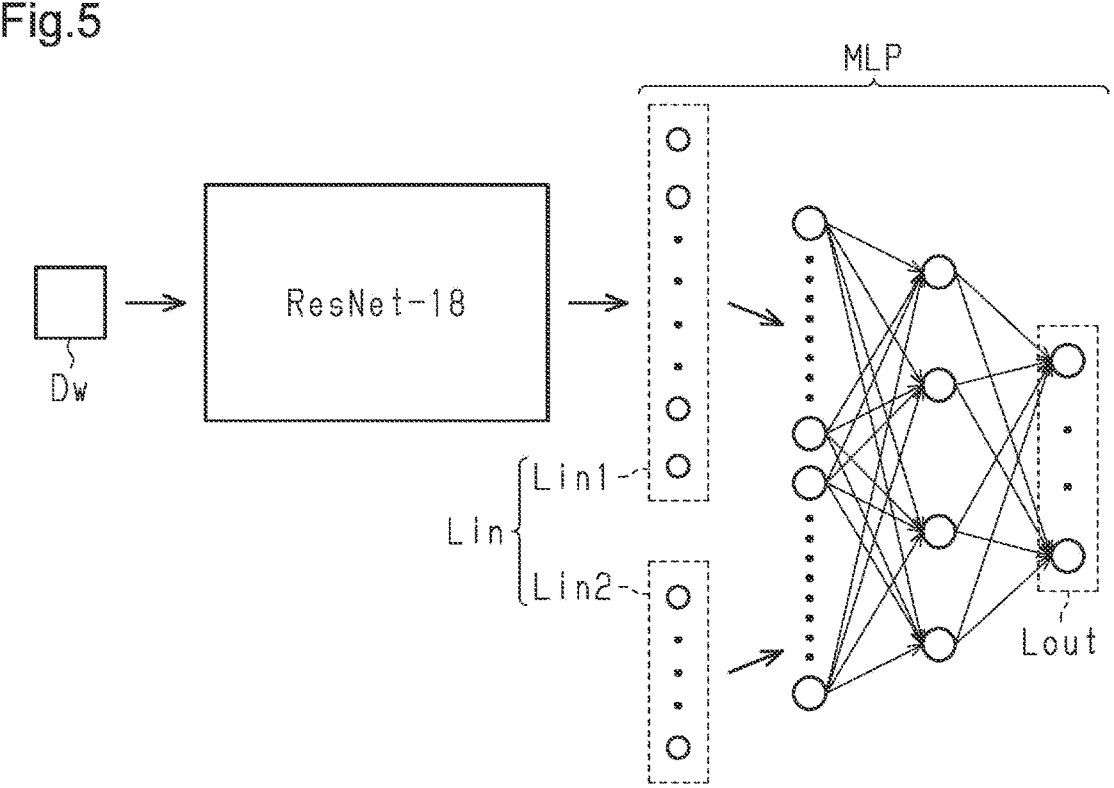
FIG. 5 is an explanatory diagram illustrating a structure of a pretrained model stored in a memory device of the vehicle evaluation system of FIG. 1.

FIG. 5 is an explanatory diagram illustrating a configuration of a pretrained model stored in the memory device 120. As illustrated in FIG. 5, the pretrained model is a model in which an output layer for classification of ResNet-18 is replaced with a neural network MLP and the neural network MLP is trained by supervised learning.

An input layer Lin of the neural network MLP includes a first input layer Lin1, to which an output from ResNet-18 is input, and a second input layer Lin2. Accordingly, the vehicle evaluation system can also reflect data other than the evaluation sound data included in the evaluation data in the evaluation of the target vehicle 10. For example, the second input layer Lin2 includes a node for inputting the data of the outside air temperature. By increasing the number of nodes in the second input layer Lin2 in accordance with the number of input datasets, other datasets can be used as the evaluation datasets.

In the vehicle evaluation system, the data center 100 inputs the evaluation data to the pretrained model to execute a generation process of generating, as the generated data, the operation data indicating changes in the operation information of the target vehicle 10 in the measurement operation pattern. As described above, the evaluation data is data acquired while operating the target vehicle 10 in the measurement operation pattern. As described with reference to FIG. 3, the operation information related to the measurement operation pattern is the throttle opening degree and the brake hydraulic pressure. Therefore, an output layer Lout of the neural network MLP includes a node that outputs the throttle opening degree and a node that outputs the brake hydraulic pressure. By increasing the number of nodes of the output layer Lout of the neural network MLP in accordance with the number of pieces of data to be output, it is possible to increase the types and the number of pieces of operation information used for evaluation.

As described above, the pretrained model used in the vehicle evaluation system is a model obtained by performing transfer learning so that a model in which the output layer for classification of ResNet-18 is replaced with the neural network MLP becomes a regression model that outputs the throttle opening degree and the brake hydraulic pressure.

<Model Training>

Next, a training process for training the model shown in FIG. 5 to obtain a pretrained model will be described. Training of the model is performed by supervised learning using a large amount of measurement data collected in advance using a reference vehicle serving as a reference for evaluation. In this example, a vehicle is used as the reference vehicle after completion of a certain break-in operation after manufacture, sufficient maintenance and inspection are performed, and it is confirmed that there is no anomaly. That is, the reference vehicle is a vehicle in an extremely good state with almost no deterioration.

<Data Acquisition Process>

The data acquisition process of acquiring the measurement data is executed by a computer that can be connected, in the same manner as the vehicle computer 300, to the vehicle control unit 20 to operate the vehicle.

Figure 6:
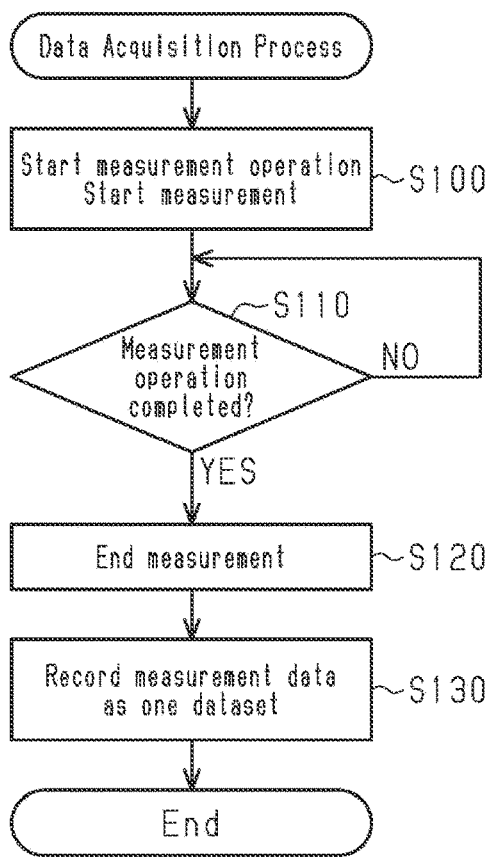
FIG. 6 is a flowchart of a data acquisition process executed in the vehicle evaluation system of FIG. 1.

FIG. 6 is a flowchart showing a flow of the data acquisition process of acquiring the measurement data. As shown in FIG. 6, when the computer starts the data acquisition process, the computer first starts a measurement operation in the measurement operation pattern and starts data measurement in the process of step S100. The measurement operation is an operation of the vehicle for acquiring measurement data. Then, while operating the reference vehicle in the measurement operation pattern, the computer records sound data using the microphone 350 and acquires data of the outside air temperature. The sound data containing the sound emitted by the reference vehicle to train the model is training sound data.

In the process of step S110, the computer determines whether the measurement operation in the measurement operation pattern has been completed. When it is determined that the measurement operation in the measurement operation pattern has not been not completed (step S110: NO), the computer repeats the process of step S110.

When it is determined that the measurement operation in the measurement operation pattern has been completed in the process of step S110 (S110: YES), the computer advances the process to step S120. Then, in step S120, the computer ends the measurement.

When the measurement is ended in this way, the computer records, as one dataset, the measurement data acquired while performing the series of measurement operations in the measurement operation pattern and the data of the operation information in the measurement operation pattern in the memory device, in the processing of step S130.

That is, the computer records, as one dataset, the data of changes in the throttle opening degree and the data of changes in the brake hydraulic pressure, which are the data of the operation information in the measurement operation pattern, and the sound data and the data of the outside air temperature, which are the measurement data, in the memory device. Then, the computer temporarily ends the data acquisition process.

In this way, acquisition of one dataset is completed. The training data used for the supervised learning is collected by collecting a large number of datasets of the measurement data acquired while operating the reference vehicle in the measurement operation pattern by performing the data acquisition process many times.

Figure 7:
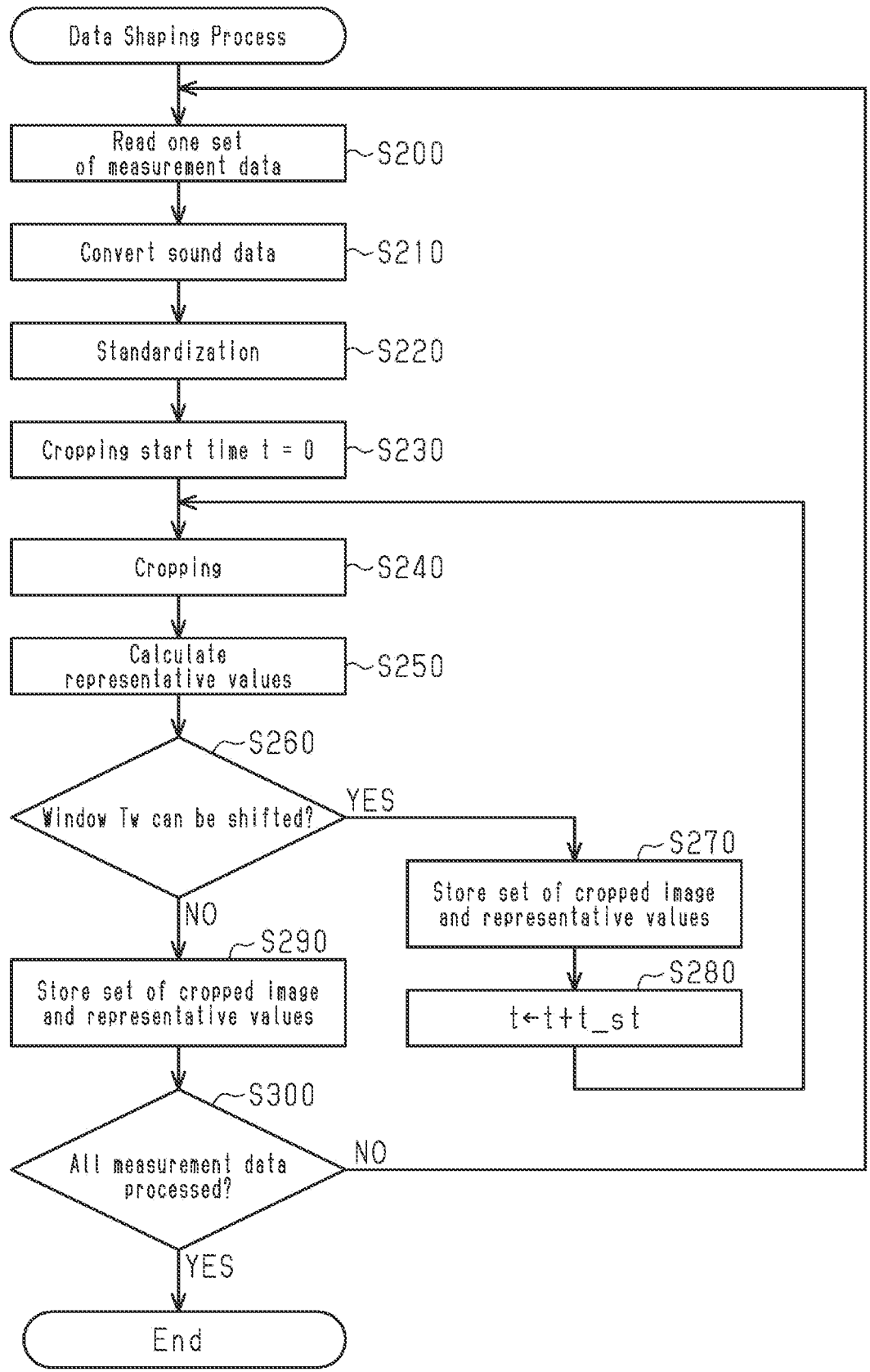
FIG. 7 is a flowchart of a data shaping process executed in the vehicle evaluation system of FIG. 1.
Figure 8:
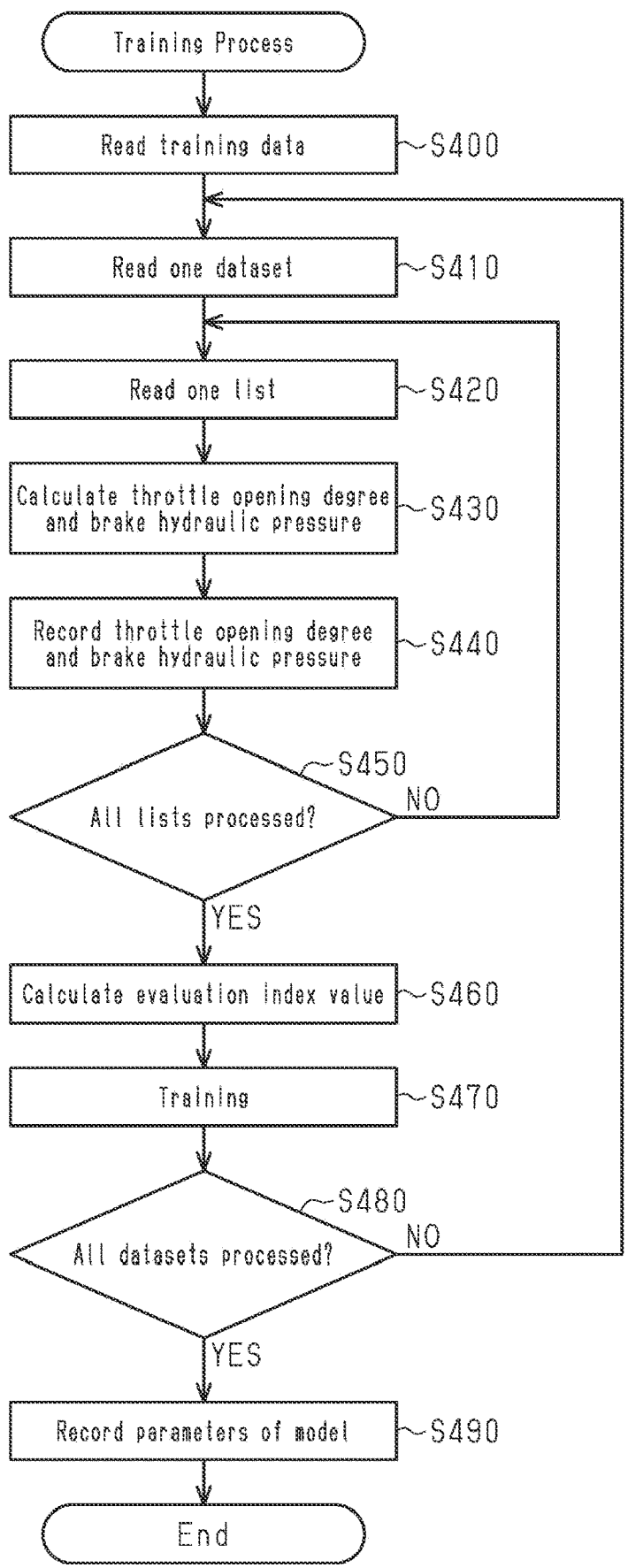
FIG. 8 is a flowchart of a training process executed in the vehicle evaluation system of FIG. 1.

The datasets of the measurement data thus collected are shaped into data to be input to the model through the data shaping process shown in FIG. 7.

<Data Shaping Process>

As described above, the data shaping process is a process of cropping one dataset for each range of the window Tw while shifting the window Tw and shaping the dataset into multiple lists.

The data shaping process is performed by a computer. The computer that performs the data shaping process may be the same as the computer that performs the data acquisition process, or may be a different computer. For example, a computer with high processing capability such as the data center 100 may be used. A large number of datasets collected by repeatedly executing the data acquisition process are stored in a memory device of the computer that executes the data shaping process.

When the data-shaping process is started, the computer first reads one dataset of the measurement data in the process of step S200. Next, in step S210, the computer converts the sound data in the dataset read in step S200 into a mel spectrogram. Then, the computer advances the process to step S220. In the process of step S220, the computer standardizes the data other than the sound data in the dataset.

Next, in step S230, the computer sets the cropping start time t to 0. Then, in step S240, the computer crops the data. That is, the computer sets the start point of the window Tw to the cropping start time t and crops the data in the range within the window Tw. Specifically, as shown in FIG. 4, the computer crops an image in the range of the window Tw from the mel spectrogram. As shown in FIG. 3, the computer crops data in the range of the window Tw from each of the outside air temperature data, the throttle opening degree data, and the brake hydraulic pressure data.

In the process of step S250, the computer calculates representative values of the outside air temperature data, the throttle opening degree data, and the brake hydraulic pressure data, which have been cropped through the process of step S240. For example, the computer calculates an average value of data within the range of the window Tw as a representative value in the window Tw. Instead of the average value, a maximum value or a minimum value may be calculated as the representative value. After calculating the representative values of the outside air temperature, the throttle opening degree, and the brake hydraulic pressure, the computer advances the process to step S260.

In the process of step S260, the computer determines whether the window Tw can be shifted by the stride t_st. The cropping of data is performed by repeating the cropping by shifting the window Tw by the stride t_st with respect to the dataset acquired while the measurement operation is performed in the measurement operation pattern. When the window Tw reaches the end of the dataset and all data included in the dataset has been cropped, the window Tw can no longer be shifted by the stride t_st. When the window Tw cannot be shifted by the stride t_st in this way, the computer makes a negative determination in the process of step S260.

In the process of step S260, when it is determined that the window Tw can be shifted by the stride t_st (step S260: YES), the computer advances the process to step S270. In the process of step S270, the computer stores a set of the data of the cropped image and the representative values in one list. When storing the set in the list, the computer resizes the image data to a size of 224×224, which is suitable for input to ResNet-18. Then, the computer updates the cropping start time t. Specifically, the computer updates the cropping start time t by setting a new cropping start time t to a sum obtained by adding the stride t_st to the cropping start time t. As a result, the window Tw is shifted by the stride t_st.

Then, the computer shifts the window Tw by an amount corresponding to the stride t_st, and executes the processes from step S240 to step S260 again. That is, the computer repeats the processes from step S240 to step S280 until the window Tw can no longer be shifted by the stride t_st.

When the computer determines that the window Tw can no longer be shifted in the process of step S260 (step S260: NO), the computer advances the process to step S290. The process of step S290 is the same as the process of step S270. After storing the data in the list in the process of step S290, the computer advances the process to step S300.

In the process of step S300, the computer determines whether all the datasets prepared for shaping in the process of step S200 have been processed. In the process of step S300, when it is determined that the processes of all the datasets are not completed (step S300: NO), the computer returns the process to step S200. Then, the computer reads one unprocessed dataset and executes the process of step S210 and subsequent steps.

When it is determined that all the datasets have been processed in the process of step S300 (step S300: YES), the computer ends the series of data shaping processes. In this way, the computer shapes each of the prepared datasets of the measurement data into the shapes of multiple lists. In this vehicle evaluation system, a training process for training a model is performed using a large number of datasets each shaped into a set of multiple lists through the data shaping process.

<Training Processing>

This training process is performed by a computer. It is preferable that a computer having a high processing capability such as the data center 100 be used as the computer that performs the training process. A large number of datasets shaped through the data shaping process are stored as training data in a memory device of the computer that executes the training process. The amount of learning data stored in the memory device is set to an amount with which a pretrained model with sufficient accuracy can be obtained based on a result of verification performed in advance.

When the training process is started, the computer first reads the training data stored in the memory device in step S400. Then, in the next step S410, the computer reads one dataset from the read training data.

Next, in the process of step S420, the computer reads one list from the dataset. Then, the computer inputs the data of the list to the model described with reference to FIG. 5 to calculate the throttle opening degree and the brake hydraulic pressure. When the training process is started, the parameters of the model are in the initial state. That is, although a portion of ResNet-18 is in a trained state, the weight and the bias of a portion of the neural network MLP are initial values. In this training process, the computer updates the weights and biases of the portion of the neural network MLP.

To be more specific, in the process of step S430, the computer inputs, to ResNet-18, image data Dw, which has been resized to the size of 224×224 and is included in the list, as shown in FIG. 5. Then, the computer inputs the representative values of the outside air temperature to the second input layer Lin2 of the neural network MLP. The feature quantity of the image data Dw is extracted through the ResNet-18 and input to the first input layer Lin1 of the neural network MLP. Then, values of the throttle opening degree and the brake hydraulic pressure are output from the output layer Lout of the neural network MLP. When the throttle opening degree and the brake hydraulic pressure are calculated in this way, the computer records the calculated values of the throttle opening degree and the brake hydraulic pressure in the processing of step S440.

Next, the computer determines whether all the lists included in the dataset have been processed in the process of step S450. In the process of step S450, when it is determined that the processes of all the lists have not been not completed (step S450: NO), the computer returns the process to step S420. Then, the computer reads one unprocessed list and executes the process of step S430 and the subsequent steps.

When it is determined that all the lists have been processed in the process of step S450 (step S450: YES), the computer advances the process to step S460. In this way, the computer calculates the value of the throttle opening degree and the value of the brake hydraulic pressure for each of the lists included in the read dataset. Then, the computer records the calculated values and generates data indicating changes in the throttle opening degree and the brake hydraulic pressure in the measurement operation pattern as shown in the timing diagram of FIG. 3.

In the process of step S460, the computer calculates an evaluation index value. The evaluation index value is a value indicating the magnitude of a deviation between the values of the throttle opening degree and the brake hydraulic pressure calculated through the process in step S430 and the values of the throttle opening degree and the brake hydraulic pressure measured in the measurement operation pattern included in the dataset. The data of the throttle opening degree and the brake hydraulic pressure measured in the measurement operation pattern included in the dataset are correct values.

The computer calculates the magnitude of the deviation between the value calculated through the processing of step S430 and the correct value. For example, the computer calculates a mean squared error of the throttle opening degree calculated through the process of S430 and the correct throttle opening degree, and a mean squared error of the brake hydraulic pressure calculated through the process of S430 and the correct brake hydraulic pressure. Then, the computer calculates, as the evaluation index value, the sum of these values in the measurement operation pattern of the specified time period. When the evaluation index value is calculated in this way, the computer advances the process to step S470.

In the process of step S470, the computer performs training. Specifically, the computer adjusts the weight and the bias in the neural network MLP by the backpropagation so that the value of the evaluation index value becomes small.

Then, the computer determines whether all the datasets included in the read training dataset have been processed in the process of step S480. In the process of step S480, when it is determined that the processes of all the datasets have not been completed (step S480: NO), the computer returns the process to step S410. Then, the computer reads one unprocessed dataset and executes the process of step S420 and subsequent steps. The computer repeats the training to train the model until the processes for all the datasets are completed. In this way, the computer trains the model to be able to generate operation data, which is data indicating changes in operation information in the measurement operation pattern, from the training data through supervised learning.

When it is determined that all the datasets have been processed in the process of step S480 (step S480: YES), the computer advances the process to step S490. In the process of step S490, the computer records, in the memory device, the parameters of the model for which training using all the datasets has been completed. Then, the computer ends the series of the training processes. Thus, data of the pretrained model is obtained through the training processes.

The data of the pretrained model thus trained through the training processes is stored in the memory device 120 of the data center 100.

Next, a data acquisition process, a data shaping process, and an evaluation process in a case in which the target vehicle 10 is evaluated using the vehicle evaluation system will be described.

<Data Acquisition Process by Vehicle Controller 300>

When a vehicle is evaluated using the vehicle evaluation system, the vehicle controller 300 is connected to the target vehicle 10 that is a vehicle to be evaluated, as described above. The microphone 350 is installed in the target vehicle 10. Then, the sound emitted from the target vehicle 10 is recorded with the microphone 350 while the target vehicle 10 is operated in the specified measurement operation pattern in response to a command from the vehicle controller 300. At the same time, the vehicle controller 300 acquires data of the outside air temperature. Specifically, the vehicle controller 300 executes the data acquisition process described with reference to FIG. 6 to acquire one dataset as the evaluation data. The sound data included in the evaluation data is the evaluation sound data.

<Data Shaping Process by Vehicle Controller 300>

The vehicle controller 300 performs the data shaping process to shape the evaluation data. Specifically, the data shaping process described with reference to FIG. 7 is executed to shape the evaluation data into multiple lists. Since only one piece of evaluation data is acquired in the data acquisition process, only one dataset is read and shaped in the data shaping process at this time. Through the data shaping process, the evaluation data is shaped into multiple lists including the image data Dw and the data of the representative value of the outside air temperature.

When the data shaping process is executed to shape the evaluation data, the vehicle controller 300 transmits the shaped evaluation data to the data center 100.

<Evaluation Process by Data Center 100>

Upon receiving the evaluation data, the data center 100 stores the evaluation data in the memory device 120. Then, the data center 100 executes the evaluation process of evaluating the target vehicle 10 by executing the routine illustrated in FIG. 9. The routine illustrated in FIG. 9 is executed by the processing circuitry 110 of the data center 100.

Figure 9:
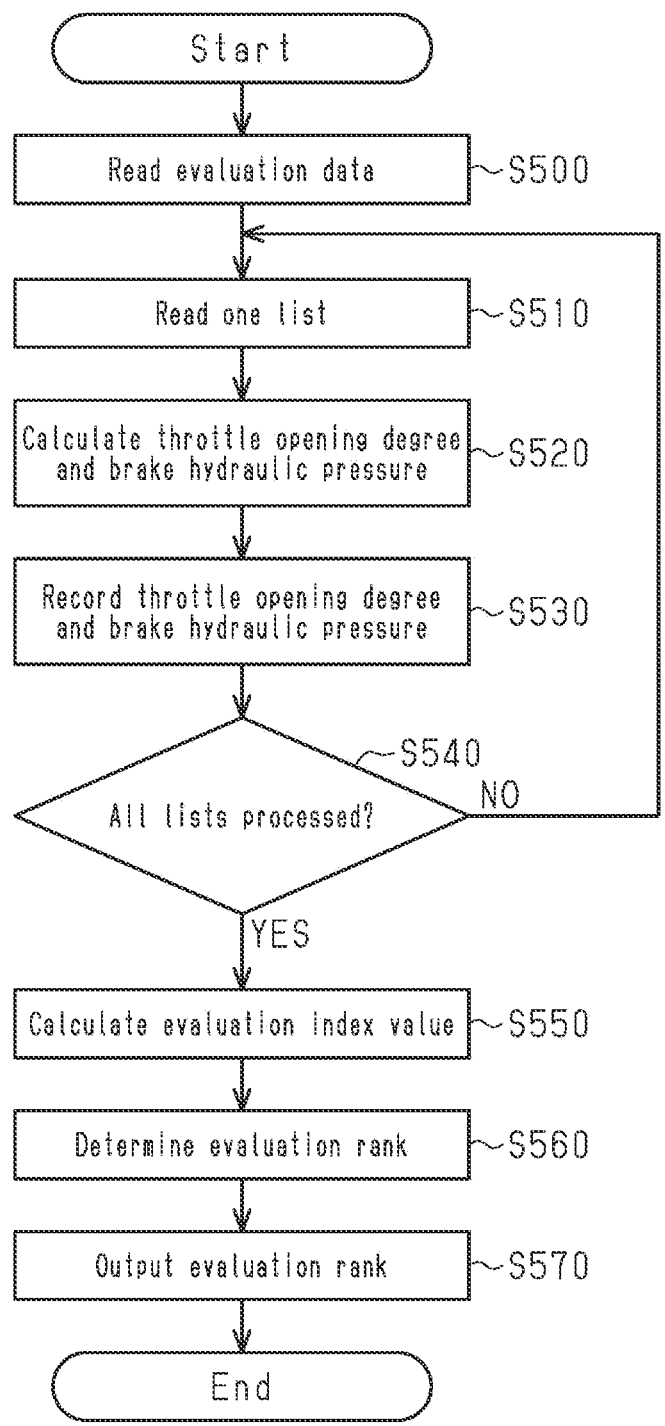
FIG. 9 is a flowchart relating to a generation process and an evaluation process executed by a data center of the vehicle evaluation system of FIG. 1.

As shown in FIG. 9, when this routine is started, the data center 100 reads the evaluation data stored in the memory device 120 in the process of step S500. Then, through the processes from step S510 to step S540, the calculation of the throttle opening degree and the brake hydraulic pressure is repeated using the pretrained model stored in the memory device 120.

To be more specific, the data center 100 reads one list from the evaluation dataset in the process of step S510. Then, in the process of step S520, the data center 100 calculates the throttle opening degree and the brake hydraulic pressure by inputting the list to the pretrained model, similarly to the process of step S430 in the training process. When the throttle opening degree and the brake hydraulic pressure are calculated in this way, the data center 100 records the value of the throttle opening degree and the value of the brake hydraulic pressure in the processing of step S530.

Next, the data center 100 determines whether all the lists included in the dataset have been processed in the process of step S540. In the process of step S540, when it is determined that the processes of all the lists have not been completed (step S540: NO), the data center 100 returns the process to step S510. Then, the data center 100 reads one unprocessed list and executes the process of step S520 and the subsequent steps. When it is determined that all the lists have been processed in the process of step S540 (step S540: YES), the data center 100 advances the process to step S550.

In this way, the data center 100 calculates the value of the throttle opening degree and the value of the brake hydraulic pressure for each list included in the read evaluation data. Then, the data center 100 records the calculated values and generates data indicating changes in the throttle opening degree and the brake hydraulic pressure in the measurement operation pattern. The series of processes from step S510 to step S540 is a generation process of inputting the evaluation data to the pretrained model and outputting the generated data.

In the process of step S550, the data center 100 calculates the evaluation index value in the same manner as in the process of step S460 in the training process. The pretrained model is optimized to generate generated data that is obtained by restoring the operation data from the sound emitted from the reference vehicle. Therefore, when the evaluation sound data emitted from the target vehicle 10 in a state different from that of the reference vehicle is input, the operation data cannot be correctly restored. That is, when the state of the target vehicle 10 deviates from the state of the reference vehicle, a deviation occurs between the operation data stored in the dataset as the correct data and the generated data. The evaluation index value indicates the magnitude of this deviation. That is, the larger the evaluation index value, the more deviated from the state of the reference vehicle the state of the target vehicle 10 becomes. As described above, the reference vehicle is a vehicle in extremely good condition with almost no deterioration. Therefore, in this evaluation system, as the evaluation index value decreases, the state of the target vehicle 10 is considered to be closer to the state of the reference vehicle and is evaluated to be higher. When the evaluation index value is calculated in this way, the data center 100 advances the process to step S560.

In the process of step S560, the data center 100 determines the evaluation rank based on the evaluation index value. The data center 100 determines the evaluation rank by selecting an evaluation rank corresponding to the magnitude of the evaluation index value from among four evaluation ranks of an S rank, an A rank, a B rank, and a C rank. The S rank is an evaluation rank indicating that the vehicle has the highest evaluation level among the four evaluation ranks. Rank C is an evaluation rank indicating that the vehicle is at the lowest evaluation level among the four evaluation ranks. The evaluation decreases in the order of the S rank, the A rank, the B rank, and the C rank, and the C rank is the evaluation rank having the lowest evaluation.

When the evaluation index value is less than or equal to a first threshold, the data center 100 selects the S rank as the evaluation rank. When the evaluation index value is greater than the first threshold and less than or equal to a second threshold, the data center 100 selects the A rank as the evaluation rank. The second threshold is greater than the first threshold. When the evaluation index value is greater than the second threshold and less than or equal to a third threshold, the data center 100 selects the B rank as the evaluation rank. The third threshold is greater than the second threshold. When the evaluation index value is greater than or equal to the third threshold, the data center 100 selects the C rank as the evaluation rank.

The magnitudes of the first threshold, the second threshold, and the third threshold may be set in advance with reference to, for example, the correlation between the evaluation and the price of the vehicle in the secondhand car market. Alternatively, it may be set based on results of durability tests or simulations of the vehicle. When the evaluation rank of the target vehicle 10 is determined through the process of step S560, the data center 100 advances the process to step S570.

The process of step S550 and the process of step S560 are evaluation processes of evaluating the target vehicles 10 in accordance with the magnitude of the deviation between the operation data and the generated data by comparing the operation data with the generated data.

In the process of step S570, the data center 100 transmits the evaluation rank to the vehicle controller 300 and outputs the evaluation rank. When the evaluation rank is output in this way, the data center 100 ends this routine.

When receiving the evaluation rank, the vehicle controller 300 displays the received evaluation rank on the display device 340 as the evaluation rank of the target vehicle 10.

<Operation of Present Embodiment>

In the vehicle evaluation system, the vehicle controller 300 operates the target vehicle 10 in the specified measurement operation pattern to evaluate the target vehicle 10. Then, the vehicle controller 300 acquires the evaluation data while operating the target vehicle 10 in the specified measurement operation pattern. The vehicle controller 300 transmits the acquired evaluation data to the data center 100.

The data center 100 generates the generated data obtained by restoring the operation data from the evaluation data by executing the generation process using the pretrained model. The pretrained model is a neural network in which a feature quantity of data cropped from data for the specified time period is used as an explanatory variable and the operation information at the time point corresponding to the cropped data is used as an objective variable. Then, the data center 100 executes the evaluation process based on the generated data.

In the evaluation process, the data center 100 calculates, as an evaluation index value, the sum for the specified time period of deviations output for each piece of data that is repeatedly cropped while changing the cropping start time t. The data center 100 determines the evaluation rank of the target vehicle 10 based on the evaluation index value. Then, the evaluation rank is transmitted from the data center 100 to the vehicle controller 300.

The evaluation rank is displayed on the display device 340 of the vehicle controller 300 that has received the evaluation rank.

<Advantages of Present Embodiment>

(1) Differences in state between the target vehicle 10 and the reference vehicle appear in the magnitude of the deviation between the generated data and the operation data. Therefore, the vehicle evaluation system can determine and evaluate the differences in the state of the vehicle from the sound data.

(2) Since the evaluation is performed based on the sound data acquired when the vehicle is operated in the specified evaluation measurement pattern, the sound data used for the evaluation is always collected in the same operating state of the target vehicle 10. Therefore, the above-described vehicle evaluation system reduces the influence of variation in the sound data due to differences in the operating state.

(3) The pretrained model generates operation data from evaluation data including image data of a spectrogram obtained by performing frequency analysis on sound data. That is, the above-described vehicle evaluation system uses image data obtained by frequency-analyzing sound data. Therefore, the vehicle evaluation system efficiently extracts features included in sound data and performs the evaluation process.

(4) The above-described vehicle evaluation system divides the data for the specified time period into multiple sections and analyzes the data. The vehicle evaluation system calculates the evaluation index value by integrating the results. Therefore, with the above-described vehicle evaluation system, the size of the pretrained model is smaller than in a case in which data for the specified time period is collectively analyzed.

(5) The above-described vehicle evaluation system classifies the evaluation result according to the preset evaluation rank and outputs the evaluation result. Therefore, with the evaluation system, the relative level of the state of the target vehicle 10 in the secondhand car market is readily obtained.

(6) The sound data may be affected by differences in the measurement environment even when the state of the vehicle is the same. In the above-described vehicle evaluation system, the training data and the evaluation data include the outside air temperature data. For this reason, the vehicle evaluation system performs the evaluation while considering the influence of differences in the outside air temperature.

(7) A driving operation in the measurement operation pattern when the training data is acquired and a driving operation in the measurement operation pattern when the evaluation data is acquired may be performed by an operator operating the vehicle. However, if there is a variation in the driving operation by the operator, the variation in the driving operation affects the evaluation result. However, in the above-described vehicle evaluation system, the target vehicle 10 is operated by the vehicle controller 300. Therefore, it is possible to evaluate the target vehicle 10 while eliminating the influence caused by variations in the driving operation by the operator.

<Modifications>

The above-described embodiment may be modified as follows. The above-described embodiment and the following modifications can be combined if the combined modifications remain technically consistent with each other.

In the above-described embodiment, the vehicle controller 300 executes the data shaping process when evaluating the target vehicle 10. However, the data shaping process may be executed in the data center 100.

In the above-described embodiment, data obtained by converting sound data into a mel spectrogram is used. However, the data used as the measurement data and the evaluation data do not necessarily need to be a mel spectrogram. For example, a spectrogram obtained by performing wavelet transform on sound data may be used. A spectrogram obtained by performing short-time Fourier transform on sound data may be used.

It is not essential to convert the sound data into image data. For example, a feature quantity may be extracted from the sound data itself and used as measurement data and evaluation data. In this case, it is not necessary to use ResNet-18, which handles image data as a model used for the evaluation process. For example, a neural network may be used.

In the above-described embodiment, the pretrained model is a model obtained by performing transfer learning on ResNet-18. However, the structure of the model is not limited to such a structure. It is sufficient if the pretrained model outputs the generated data based on the evaluation data.

In the above-described embodiment, the evaluation rank is determined based on the evaluation index value in the evaluation process. However, the evaluation process is not limited to this. For example, the evaluation index value may be output, without being changed, as a value indicating lower evaluation as the value increases, and may be displayed on the display device 340.

In the above-described vehicle evaluation system, the target vehicle 10 is evaluated using a vehicle in extremely good condition as a reference vehicle. It is not necessary to use a vehicle in good condition as the reference vehicle. For example, a vehicle in very bad condition and having a low rating may be used as the reference vehicle. The evaluation index value in the above-described evaluation process is a value indicating the degree of deviation between the condition of the reference vehicle and the condition of the target vehicle 10. Therefore, if a deteriorated vehicle having an extremely low evaluation is used as the reference vehicle, the smaller the evaluation index value, the lower the evaluation becomes. The target vehicle 10 can also be evaluated using such an evaluation index value.

Other operation information may be included in the operation data. For example, information on the gear ratio may be included. In addition, information on a steering angle may be included. In addition, information on an operation state of the air conditioner of the vehicle may be included. In addition, operation information of electric components of the vehicle such as wipers and power windows may be included.

Further, the training data and the evaluation data may include operation information of these electrical components.

The training data and the evaluation data may include data of the gear ratio acquired from the transmission control unit 30 in addition to the sound data. The sound data is also changed by changing the gear ratio. By adding the data of the gear ratio to the training data and the evaluation data, it is possible to perform evaluation in a form in which the influence due to differences in the gear ratio is taken in to account.

Data of the coolant temperature THW detected by the coolant temperature sensor 36 may be included in the training data and the evaluation data. Data of the air-fuel ratio detected by the air-fuel ratio sensor 37 may be included in the training data and the evaluation data.

In the above-described embodiment, the data center 100 and the vehicle controller 300 are provided as the vehicle evaluation system. However, the configuration of the vehicle evaluation system is not limited to such a configuration. For example, the vehicle evaluation system may include only the data center 100 that performs the generation process and the evaluation process. In this case, the vehicle evaluation system performs the generation process and the evaluation process using the received evaluation data and outputs an evaluation result. In this case, the vehicle evaluation system does not have a function of operating the target vehicle 10.

In addition, for example, the data of the pretrained model may be stored in the memory device 320 of the vehicle controller 300, and the vehicle evaluation system may include only the vehicle controller 300. In this case, the generation process and the evaluation process are executed in the vehicle controller 300.

Figure 10:
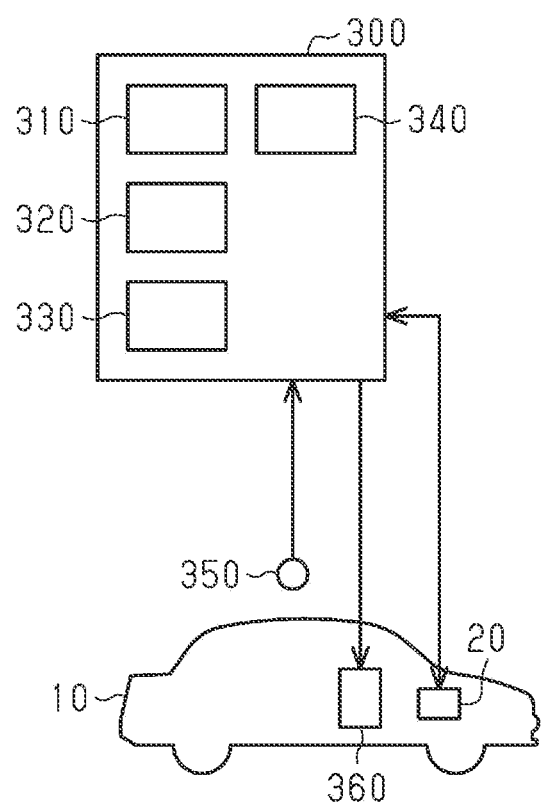
FIG. 10 is a schematic diagram showing a modification of the vehicle evaluation system.

In the above-described embodiment, the vehicle controller 300 is connected to the vehicle control unit 20 of the target vehicle 10 to operate the target vehicle 10. However, a method of operating the target vehicle 10 is not limited to such a method. For example, as shown in FIG. 10, the vehicle controller 300 may include an actuator 360 that physically manipulates the target vehicle 10. In the case of such a configuration, the target vehicle 10 can be operated in the measurement operation pattern by operating the accelerator pedal or the brake pedal by the actuator 360. The actuator 360 may be anything if it can operate an operation target, and may be a robot or the like.

Further, in the above-described embodiment, the vehicle controller 300 includes the microphone 350. However, the vehicle controller 300 itself does not necessarily need to include the microphone 350. The sound data recorded while operating the vehicle 10 in the measurement operation pattern may be acquired from an external device to perform the data shaping process, the generation process, and the evaluation process.

The generation process and the evaluation process may be performed using multiple pieces of sound data recorded using multiple microphones 350.

The operation of the vehicle 10 in the measurement operation pattern may be performed by the operator.

In the above-described embodiment, evaluation is performed on four-level evaluation ranks. The number of the evaluation ranks does not necessarily need to be four. For example, the number of the evaluation ranks may be increased. Also, the number of the evaluation ranks may be reduced. For example, two-stage evaluation may be performed to determine whether the vehicle is in good condition or in bad condition.

In the above-described embodiment, the vehicle evaluation system evaluates the target vehicle 10 itself. However, the vehicle evaluation system may evaluate the target vehicle 10 by evaluating a specific unit in the target vehicle 10. For example, the vehicle evaluation system may evaluate the transmission mounted on the target vehicle 10 using sound data obtained by recording sound emitted from the transmission.

In the above-described embodiment, the vehicle evaluation system includes the processing circuitry 110 and the memory device 120 and executes software processing using these. However, this is merely an example. For example, the vehicle evaluation system may include a dedicated hardware circuit (such as an ASIC) that executes at least part of the software processing executed in the above-described embodiment. That is, the vehicle evaluation system may be modified if it has any one of the following configurations (A) to (C). (A) The vehicle evaluation system includes an execution device that executes all of the above-described processes according to programs and a memory device that stores the programs. That is, the vehicle evaluation system includes a software execution device. (B) The vehicle evaluation system includes an execution device that executes part of the above-described processes according to programs and a memory device. The vehicle evaluation system further includes a dedicated hardware circuit that executes the remaining processes. (C) The vehicle evaluation system includes a dedicated hardware circuit that executes all of the above-described processes. Multiple software execution devices and/or multiple dedicated hardware circuits may be provided. That is, the above processes may be executed by processing circuitry that includes at least one of a set of one or more software processing devices and a set of one or more dedicated hardware circuits. The memory device, which stores programs, or a computer-readable medium, includes any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle evaluation system configured to evaluate a target vehicle, which is a vehicle to be evaluated, using sound data obtained by recording sound emitted from the target vehicle, the vehicle evaluation system comprising:
   processing circuitry; and
   a memory device, wherein
   the memory device stores data of a pretrained model trained with training data, and
   the training data includes training sound data and training operation data,
   the training sound data is data of sound emitted from a reference vehicle in a state serving as a reference for evaluation, the sound being recorded while the reference vehicle is operated in a measurement operation pattern for a specified time period,
   the training operation data is data indicating changes in operation information in the measurement operation pattern,
   the pretrained model is a model trained by supervised learning using the training data, to generate, from evaluation data, generated data, which is data of the operation information,
   the processing circuitry is configured to execute a generation process and an evaluation process,
   the generation process is a process of outputting the generated data which is generated by inputting the evaluation data to the pretrained model,
   the evaluation data includes evaluation sound data that is data of sound emitted from the target vehicle and recorded while operating the target vehicle in the measurement operation pattern,
   the evaluation process is a process of comparing operation data of the target vehicle with the generated data and evaluating the target vehicle according to a magnitude of a deviation between the operation data of the target vehicle and the generated data,
   the pretrained model is a neural network in which a feature quantity of data cropped from the data for the specified time period is used as an explanatory variable, and the operation information at a time point corresponding to the cropped data is used as an objective variable,
   the evaluation process includes calculating, as an evaluation index value, a sum total for the specified time period of the deviation between the operation data of the target vehicle and the generated data output for each piece of the data that is repeatedly cropped while changing a cropping start time, wherein
   the evaluation index is used as a quantitative measure of vehicle health, such that a higher a value of the evaluation index, the more the vehicle's health deviates from a healthy reference vehicle.

2. The vehicle evaluation system according to claim 1, wherein the pretrained model is configured to generate the operation data of the target vehicle from evaluation data including image data of a spectrogram obtained by performing frequency analysis on the sound data.

3. The vehicle evaluation system according to claim 1, wherein the evaluation process includes selecting and outputting an evaluation rank that corresponds to a magnitude of the evaluation index value from among evaluation ranks divided according to the magnitude of the evaluation index value.

4. The vehicle evaluation system according to claim 1, wherein the operation data of the target vehicle includes data of a throttle opening degree and data of a brake hydraulic pressure.

5. The vehicle evaluation system according to claim 1, wherein each of the training data and the evaluation data includes outside air temperature data in addition to the sound data.

6. The vehicle evaluation system according to claim 1, wherein each of the training data and the evaluation data includes data of a gear ratio in addition to the sound data.

7. The vehicle evaluation system according to claim 1, comprising a vehicle controller configured to operate the target vehicle in the measurement operation pattern.

8. The vehicle evaluation system according to claim 7, wherein the vehicle controller includes an actuator configured to achieve a driving operation of the vehicle.

9. The vehicle evaluation system according to claim 7, wherein the vehicle controller includes a microphone configured to record the sound data.

10. The vehicle evaluation system according to claim 7, further comprising:
    a data center including the processing circuitry and the memory device; and
    the vehicle controller connected to the data center through a communication network.

11. The vehicle evaluation system according to claim 1, wherein the evaluation index is used to estimate resale value of the target vehicle.

12. The vehicle evaluation system according to claim 1, wherein the evaluation index is used in a component-specific diagnosis to evaluate health of a particular component of the target vehicle.

* * * * *